United States Patent [19]

Glassey

[11] 4,266,430
[45] May 12, 1981

[54] PRECISION PRESSURE-RESPONSIVE FLUID GAUGE

[75] Inventor: Gene Glassey, San Diego, Calif.

[73] Assignee: Fluid Data Systems, Inc., San Diego, Calif.

[21] Appl. No.: 100,937

[22] Filed: Dec. 6, 1979

[51] Int. Cl.³ .............................................. G01L 9/14
[52] U.S. Cl. ...................................... 73/701; 73/708; 73/722
[58] Field of Search .......................... 73/701, 708, 722

[56] References Cited

U.S. PATENT DOCUMENTS

| | | | |
|---|---|---|---|
| 3,045,489 | 7/1962 | Brandt | 73/708 |
| 3,084,551 | 4/1963 | Westman | 73/708 |
| 3,320,809 | 5/1967 | Andrae | 73/722 |
| 3,372,594 | 3/1968 | Bristol | 73/708 |
| 3,475,959 | 11/1969 | Glassey | 73/296 |
| 3,739,645 | 6/1973 | Gorgens et al. | 73/701 |

*Primary Examiner*—Donald O. Woodiel

*Attorney, Agent, or Firm*—Julian Caplan

[57] ABSTRACT

A balance beam has a fulcrum, at least one bellows (connected to the source of pressure or vacuum) acting on the beam at a point along its length and a connection to the armature of a differential transformer at one end. A poise is mounted for movement along the beam by rollers riding on shoulders formed on the beam in a unique arrangement. A carriage having a connection to the poise at the elevation of the axes of the rollers moves the poise and is, in turn, driven by an expansible belt, chain or cable extending around two sprockets, one of which is driven by a servo-motor controlled by a circuit including the differential transformer. Careful provision is made for temperature compensation both longitudinally and transversely of the beam yet the drive elements are elastic. The bellows may be moved to different locations relative to the beam by use of pre-drilled holes in the beam and base plate. Two bellows, on opposite sides of the fulcrum, may be used to gauge pressure differences.

13 Claims, 6 Drawing Figures

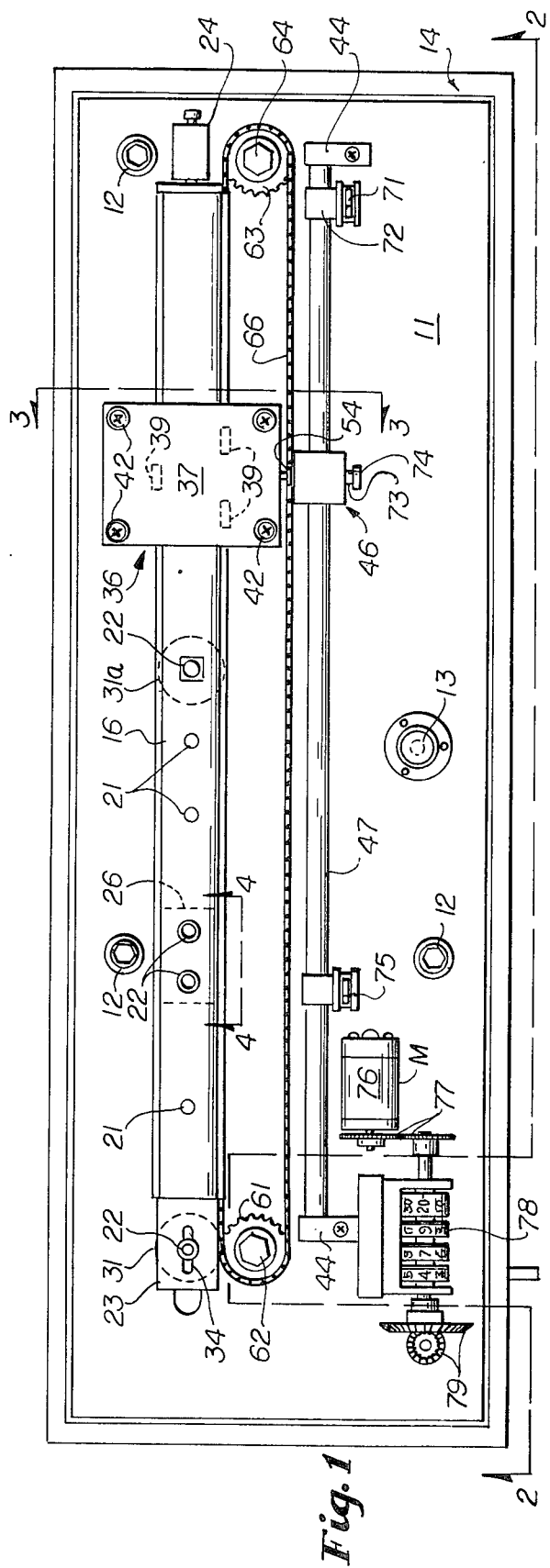
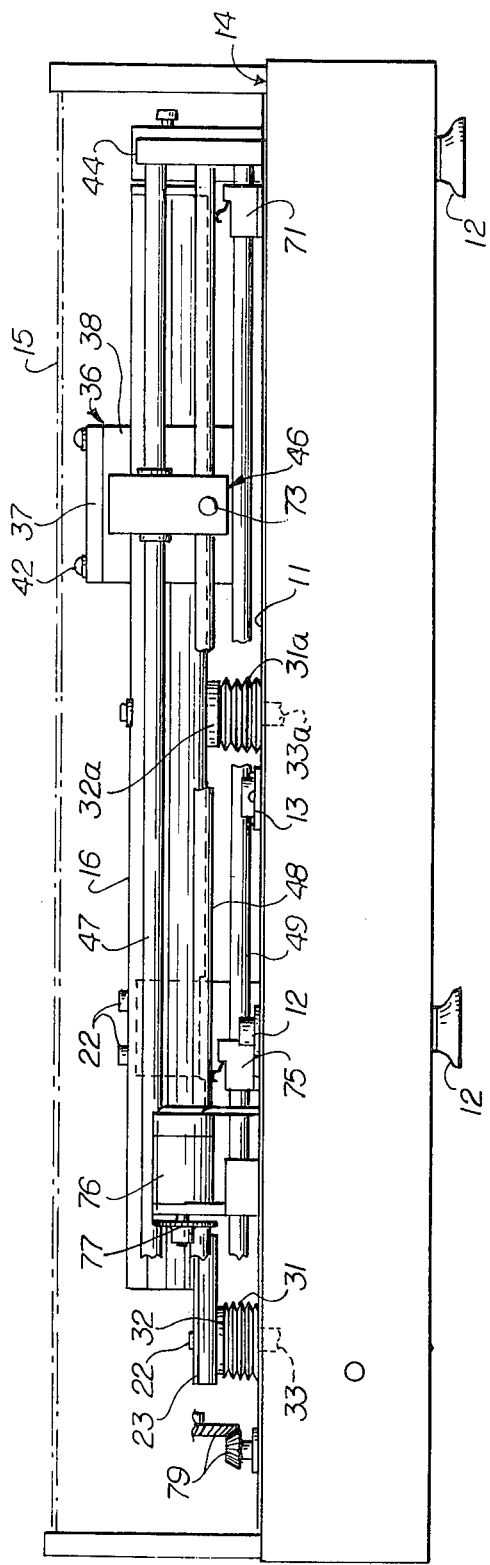
Fig.1
Fig.2

PRECISION PRESSURE-RESPONSIVE FLUID GAUGE

This invention relates to a new and improved precision pressure-responsive instrument. The device is useful in tank gauging various liquids and determining specific gravity, flow, hydrostatic pressure, surface changes and other uses. It is particularly adaptable to the "purge bubble" principle for deterination of liquid depth and specific gravity as an analog of pressure.

A particular feature and improvement of the present invention over prior gauges of this type, such as shown in U.S. Pat. No. 3,475,959, is that it has intrinsically low susceptibility to variations of temperature. Thus, in a vertical sense, the bellows which is connected to the pressure source and bears against the balance beam may be made of Invar stock and is spaced from the beam with the use of an aluminum spacer, whereas the fulcrum is preferably constructed of aluminum in combination with one or more other metals in such manner that its coefficient of expansion equals that of the bellows and spacer and thus there is no net force change vertically which is imparted to the beam with change of temperature. At the same time, relative motion between the beam balance and the electrical center of the differential transformer null-sensor is compensated. The transformer is clamped at a position corresponding to its electrical center in a manner to compensate for temperature variations and there is no differential movement with temperature change between the tip of the beam and the electrical center of the transformer.

Thus, temperature influence is minimized in the construction hereinafter described substantially to the point of elimination. The bellows are made of Invar and other material having low coefficient of expansion so that there is negligible change of the effective area with temperature change. Vertical forces imparted to the beam are made theoretically zero by employment of vertical heights of different material selected for their other advantageous properties to have zero net change of height measured relative to the axis of the beam. The components are dimensioned so that the net vertical change of height of the bellows plus an aluminum alloy spacer is equal to the aluminum alloy flexure fulcrum post and, preferably, supplemental spacer. The same logic is employed in the differential transformer body and armature mountings to have zero net change of the electrically centered null position with temperature change.

The device is also temperature compensated in a horizontal sense. The beam is preferably made of aluminum and the poise is driven by a belt or similar element which is capable of stretching to maintain proportionality of calibration. The same alloy is preferably used in the instrument frame. The moment distance between fulcrum and bellows will change with thermal expansion and contraction. This effect is substantially eliminated by using a slightly elastic linear transmission component to position the poise along the course of travel between two sprocket pulleys (driver and driven) which are mounted on the instrument chassis which has the same coefficient of expansion as the beam tube. Further, the lineal transport is of a precision nature, synchronized to the instrument read-out mechanical counter and such other output devices as may be employed for a given application. Temperature change alters the distance between centers of the two sprockets, increasing or decreasing the strain on the chain which is appropriately elastic proportionately to the change of moments in the fulcrum - bellows distance relationship, thus nullifying the influence.

Another feature of the invention is the mounting of the poise, which is usually made of brass (for its high density), on the beam which is preferably made of aluminum. A horizontal shoulder is provided on the beam and rollers on the poise rest on the shoulder. On the opposite side of the beam is a downwardly slanted shoulder on which another roller of the poise rests. The incline permits differential movement with differential temperature expansion, and the weight of the poise also serves to snug the rollers on the opposite side of the beam tube against a reference line of contact. In addition, the carriage which drives the poise is connected thereto by a ball bearing in a vertical slot having miniscule clearance. This arrangement has a further advantage of enabling the poise to be freely lifted from the beam tube for shipment or for replacement with a poise of a different weight. The employment of three rollers, two on one side and one on the other side of the beam, provides stable equilibrium.

Another feature of the invention is the fact that the bellows, or the two bellows, may be moved to any of several pre-drilled holes in the base to change the instrument in the field to alter the range or span, using the same equipment in combination with interchangeable gears to correct the ratio to readout counter and such other devices as may be employed.

The electrical circuit hereinafter described is simple in components and cost and has high reliability.

The flexure design of the fulcrum and the great rigidity of the tubular beam permits very high calibration accuracy in an operational instrument of moderate cost and physical size.

In addition, appropriate variations of the device accommodate tremendous variation in pressure range and variations in temperature. On the other hand, the device may be used to accommodate small differential pressures at high line pressure. A typical example is measuring differential pressure across primary orifices as in boiler feed water flow in power plants.

Other objects of the present invention will become apparent upon reading the following specification and referring to the accompanying drawings in which similar characters of reference represent corresponding parts in each of the several views.

In the drawings:

FIG. 1 is a top plan view of a gauge in accordance with the present invention, the representation being somewhat schematic.

FIG. 2 is a front elevational view of the structure of FIG. 1 partly broken away to reveal internal construction.

Figure 3:
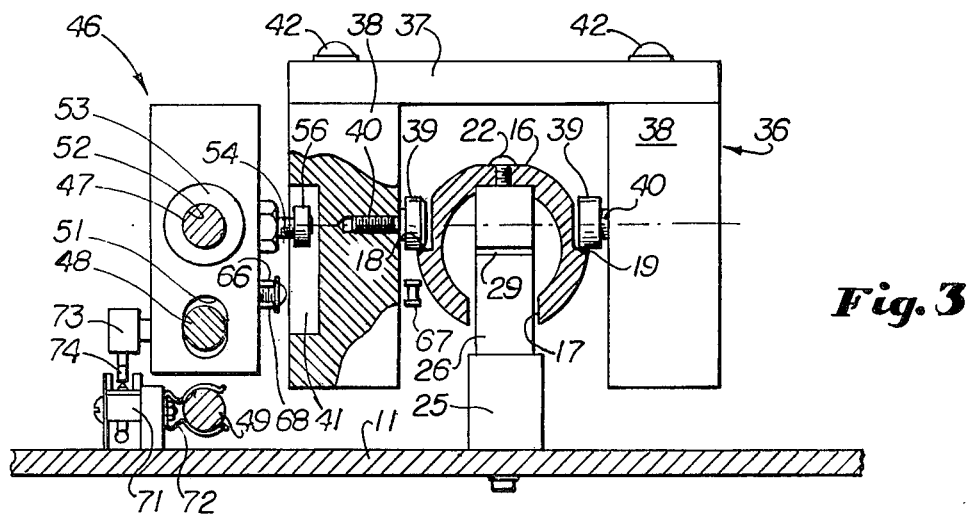
FIG. 3 is an enlarged sectional view taken substantially along the line 3—3 of FIG. 1.
Figure 4:
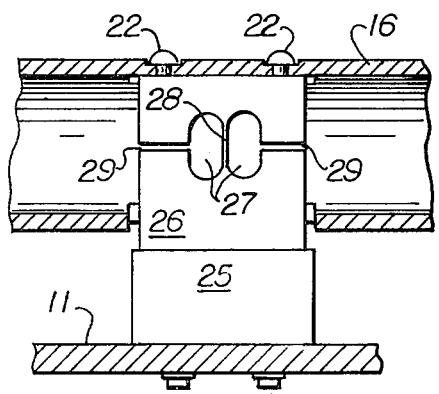
FIG. 4 is a fragmentary elevational view in enlarged scale taken substantially along the line 4—4 of FIG. 1.

The gauge of the present invention has a base 11 preferably of an aluminum alloy, the same alloy being used in other horizontal components of this device. A tripod set of support legs, two of which are adjustable in height, are used to level base 11, a bubble level 13 being used to determine when the base is level. Mounted around base 11 is a frame 14 which may support a cover 15. Extending horizontally longitudinally spaced above base 11 is tube 16 which serves as the beam of a beam balance. Tube 16 is cut away at the bottom in an opening 17. Midway of its height on one side is a horizontal shoulder 18, and on the other side a downward-outward slanted shoulder 19. Spaced apart holes 21 on the top of tube 16 receive screws 22 which attach to the beam various other components as hereinafter described, the position of attachment being adjustable by reason of the spacing of the holes 21.

Located at a selected appropriate position and extending up from base 11 is an Invar spacer 25 on which is a fulcrum 26, also formed of aluminum alloy to provide temperature expansion with bellows and differential transformer, as elsewhere described. Fulcrum 26 is preferably in the form of a flexure pivot machined in a block with transverse cut-outs 27 which are spaced apart to provide a web 28 there-between. Extending outward from each of the cut-outs 27 is a horizontal slot 29. Thus as the beam 16 tilts, the web 28 flexes and provides a stable fulcrum which eliminates the necessity of a knife edge as in conventional beam balances. Further, the web from of flexure pivots advantageously which, in turn, provides numerous advantages over alternative designs, especially knife edge configurations and other designs that preclude subject force reversal. At least one bellows 31 is preferably of Invar metal, and on its top is a spacer 32 of aluminum which is connected to extensions 23 by means of one of the screws 22. Preferably, there is a slot 34 in an extension of the left end of tube 16 to permit horizontal adjustment of bellows 31 or 31A. An attachment 33 or 33A extends from bellows 31A to the source of pressure to be measured. In some installations, a differential in pressure is to be measured. In such instance, a second bellows 31 may be positioned on base 11 on the side of fulcrum 26 opposite bellows 31A. Aforementioned slot 34 permits the slight adjustment necessary to compensate for any small variation in effective areas between bellows that may be present resulting from small manufacturing variations in presumably identical bellows. Normally, for positive pressure installations, bellows 31A only is used. Bellows 31 only is used for installations where there is sub-atmospheric pressure. Both bellows 31 and 31A are used where differentials in pressure are to be measured.

Slideable along beam 16 is a poise 36. As best shown in FIG. 3, poise 36 has a horizontal top piece 37 from which depend on opposite sides of beam 16 vertical pieces 38 secured to top piece 37 by screws 42. On the forward vertical piece 38 (i.e., left piece as viewed in FIG. 3) there are two, longitudinally spaced apart, inward extending pin-axes 40 each carrying a roller 39 which rides on horizontal track 18. The rear vertical piece 38 has a pin-axis 40 and roller 39 which rides on downward-rearward slanted track 19. Since the poise 36 and beam 16 have different coefficients of thermal expansion, the slanted shoulder 19 accommodates such expansion and further tends to draw the rollers 39 snugly against the inside reference edge of track 18. The front vertical piece 38 has on its outer face an accurately machined vertical slot 41.

Spaced forwardly on either end of the beam 16 and attached are vertical mounting blocks 44 which receive, accurately spaced-apart top precision ground metal rods 47 and 48, respectively. Which support carriage 46. Rods 47, 48 are preferably of ground stainless steel. They are mounted in slightly oversize holes in blocks 44 so as to be free to expand and contract independently of frame 11. Carriage 46 has a vertically elongated bore 51 in which rides rod 48. At the level of the axes of rollers 39 is a bore 52 having a bearing 53 for sliding movement on rod 47. Threaded horizontally within carriage 46 is a screw 54 which carries a bearing 56 on its inner end which fits into slot 41 with miniscule diametral clearance so that there is freedom of vertical motion, but negligible backlash between movement of the carriage 46 and the poise 36 which is driven thereby. It is important to note that the axes of pin 54, bearing 56 and bearings 39 lie in the same plane. Screw 54 has a hexagonal socket head used to adjust the longitudinal depth of roller 56 in slot 41.

Mounted at opposite ends of beam 16 are horizontal drive sprocket 61 having a mounting 62 and driven sprocket 63 having a mounting 64. Around the sprockets 61, 63, is a precision ladder chain 66 which passes between carriage 46 and poise 36 as close as practical to the level of the axis rod 47. The return 67 of chain 66 passes between the left proximity of the elevation of drive axis vertical piece 38 of poise 36 and the beam 16 (see FIG. 3). Chain 66 is secured by screw 68 to carriage 46. The chain 66 is sufficiently elastic to accommodate thermal expansion and contraction of base 11.

Rod 49, vertically aligned with rods 47, 48, is also mounted in blocks 44. Mounted on rod 49 at either end of the travel of poise 36 is a limit switch 71. Switch 71 is attached to rod 49 by a clip 72 so that the position of the switch may be adjusted. Connected to carriage 46 is an actuator 73 which has a head 74 which bears against the limit switch 71. Sprocket 61 is driven by a servomotor through gears 79 (below plate 11 and not shown in FIGS. 1-4 and 6). The instrument is intended for process control, and/or data recording or transmission. In these instances the instrument is equipped with a data acquisition/control device appropriate to application and which is schematically illustrated in FIGS. 1 and 2 as 76 connected to mechanical counter 78 by gears 77.

Figure 6:
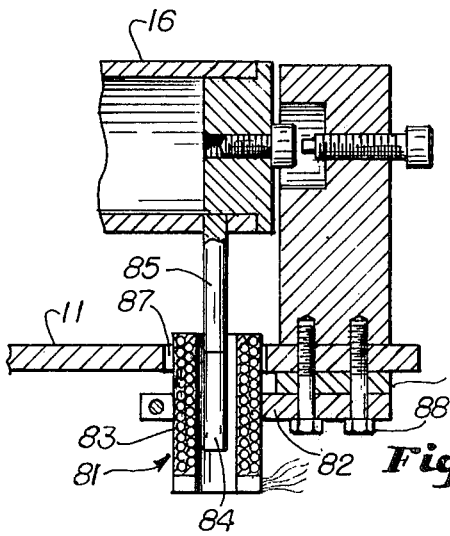
FIG. 6 is a partially schematic enlarged sectional view showing the mounting for the differential transformer.

Directing attention now to FIG. 6, in order to extend the temperature compensating features heretofore described, relative expansion and contraction of connecting members between the beam tube 16 and the electrical center of the differential transformer null-sensor 81 is made to equal the temperature change of the flexure-fulcrum 26 and hence the position of the beam to avoid force being applied to the beam by spring properties of the bellows if its nulling position is not identical with that of the null-sensor 81. The thermal expansion and contraction in a vertical sense of members 26, 31A and 85 is made to be the same by selection of materials for these elements and their mounts. Because of its electrical and mechanical symmetry, the electrical center or null position of the differential transformer body 83 does not vary with temperature. However, the body of the transformer through its length would be subject to change by an amount determined by the materials of construction. Clamp 82 secures the transformer 83 at the electrical center. Thus, the electrical center may be considered a discrete point in a vertical line of the travel of the armature 84. In the preferred embodiment shown in FIG. 6, a combination of materials is employed in a manner similar to the bellows-beam-fulcrum arrangement so that there is no differential movement with temperature change between the tip of beam 16 and the electrical center of the transformer 83. Invar has sufficient magnetic permeability to make a very satisfactory armature 84 for the null-sensor 81 and is used for that purpose in the preferred embodiment. Austenitic stainless steel (e.g., type 316) is non-magnetic and is, in the preferred embodiment, used as a spacer 85 to space the armature 84 from the tip of the beam 16. As is noted in FIG. 6, the null-sensor 81 is located in an aperture 87 in base 11.

Expansion of the differential transformer armature 84 or body 81 with temperature does not alter the electromagnetic symmetry relative to the differential transformer body electrical center relationship. However, it can be seen from FIG. 6 that, as applied in the preferred embodiment, thermal expansion moves its electrical center downward as a function of one-half its length, that is the half secured to the stainless steel spacer 86.

By design choice, clamp 82 is of aluminum alloy. The breadth of contact of clamp 82 with the coils 83 is sufficiently narrow to be treated, for practical purposes, as a point. As seen, clamp 82 is spaced below plate 11 by second spacer 86 and secured in position by screws 88. By calculations using the coefficients of expansion of the materials and the preferred length of armature 84 of 1.25", it can be determined that the length of member 85 may be 1.537" and the position and the thickness of spacer 86 may be chosen such that the position between the clamp point and the top of base plate 11 is 0.787", depending, of course, upon the materials of construction.

In practice, the null-sensor 81 is electrically centered by locking beam 16 at the correct height while sliding the coil 83 in split clamp 82 while observing the servo motion as a null indicator. A lock (not shown) is provided for this purpose as well as moving or shipping the instrument just as upon many types of beam balances and scales.

The foregoing preferred embodiment is intended for a set of conditions of use of the instrument, such as tank and hydrological level gauging, involving exposure of the instrument to outdoor ambient temperature extremes. Invar bellows 31 are desirable for maximum accuracy, that is, minimum change of effective area. For other applications, bellows of other materials such as stainless steel, bronze, etc., may be preferred. Zero differential force may be equated for any specific materials of construction.

Figure 5:
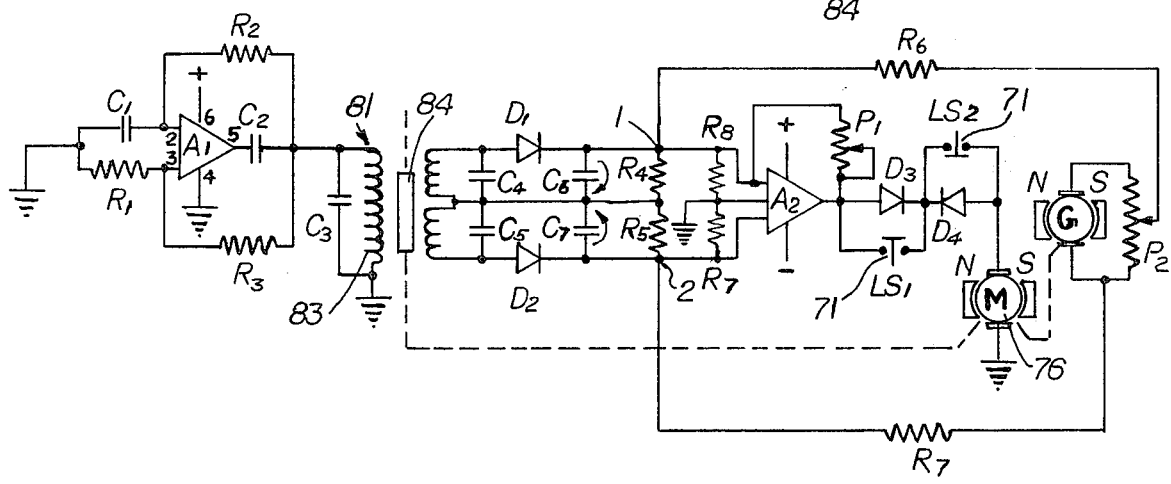
FIG. 5 is a schematic wiring diagram.

Directing attention now to the circuit diagram of FIG. 5, the differential transformer 83 is energized by a simple form of widely employed square wave oscillator employing RC timing circuits in combination with an operational amplifier A1. The square wave is converted to a sine wave by capacitors C3 and C4 and C5, respectively, across the primary and two secondaries of the differential transformer 81. The capacitors are selected to provide resonant circuits tuned with inductance of the differential transformer. This tuning also serves to provide a very strong error signal.

The secondaries of transformer 83 are connected in conventional series opposition so as to have a zero net output with the armature 84 electrically centered. However, even through the net output is zero, as sensed at points 1 and 2, the output of each secondary is strong at null, typically in excess of two volts for each half after rectification by diodes D1, D2 in series with each output. The resultant loop current indicated by curved arrows around the capacitor C6, C7 is in the strong milliampere range, far overcoming the threshold voltage of the diodes D1, D2 and passing through resistors R4, R5, after being filtered by a second pair of capacitors C6, C7. In other words, there is phase sensitive demodulation. The null voltage as seen at points 1 and 2 remains zero at null. Inequalities and imperfections in resistors R4, R5, and the diodes D1, D2, etc., are cancelled by the DT nulling a slight distance away from two electrical centers to compensate.

An instrument such as is illustrated and is described in the following table is responsive to approximately one micro-inch of differential transformer displacement. The influence of electrical component drift is insignificant with the strength of the error signal. The output from the differential amplifier A2 goes to permanent magnet motor 76 which remains stationary with zero output and rotates in either direction depending upon the polarity of the drive voltage. Limit switches 71, 72, which are located at either end of third rod 49 (or other desired positions) are in series with the output of the amplifier A2 and servo-motor. The switches cut off motor power near the limits of travel in conventional manner. The permanent magnet motor is unique as a type which lends itself to reversal and linear torque voltage characteristics in two wire forms compatible with the general logic of this system. However, in fundamental form, once a limit switch were opened by overtravel (from any cause), the instrument would remain inoperative until operation were restored by external means. Heretofore, this has been a problem since one of the intended used of an instrument of this type is unattended, often in remote areas, and the overtravel of the poise 36 tends to occur in periods of key need. Although data for travel of the poise beyond full scale is lost, even with the present invention, such loss is of limited duration as contrasted with subsequent disablement. The use of diodes D3, D4, across the contacts of the limit switches 71, 72, pointed in direction to pass reverse current only, solves the problem. By this means, the instrument can freely travel downscale from the limit switches.

The generator G is a tachometer type and generates a derivative voltage for anti-hunt damping which is mixed with the error signal at points 1 and 2 following adjustment of the potentiometer Pe of the damping signal.

It will be understood that the choice of components is subject to wide variation, but for practical purposes, in a specific embodiment wherein the oscillator is normally 2.5 KHz, the following are suggested components:

| R1 | 11K (ohms) |
| R2 | 30K |
| R3 | 10K |
| R4 | 10K |
| R5 | 10K |
| R6 | 10K |
| R7 | 10K |
| R8 | 10K |
| R9 | 10K |
| P1 | 5 Meg |
| P2 | 5 Meg |
| C1 | 0.1 μFd |
| C2 | 4.7 |
| C3 | 0.10 |
| C4 | 0.05 |
| C5 | 0.05 |
| C6 | 22 |
| C7 | 22 |
| D1 | IN 4001 |
| D2 | IN 4001 |
| D3 | IN 4001 |
| D4 | IN 4001 |

-continued

A1-LM386
A2-LH0021CK (National Semiconductor)

What is claimed is:

1. In a pressure-responsive gauge of the type having a base, a balance beam, a fulcrum pivotally supporting said beam relative to said base, pressure-responsive means interposed between said base and said beam arranged to tilt said beam, a poise slideable along said beam to counter-balance the force of said pressure-responsive means, drive means for moving said poise, said drive means including a flexible member extending parallel to said beam and a servo-motor arranged to move said flexible member, an armature attached to one end of said beam, a differential transformer excited by said armature, an electric circuit including said transformer and said servo-motor functioning to move said poise to null said transformer and a read-out driven by said servo-motor, the improvement comprising temperature responsive means to compensate for temperature variations in a vertical sense comprising a first spacer between said pressure-responsive means and said base of a different material than said pressure-responsive means, said firt spacer and said pressure-responsive means having dimensions and coefficients of expansion such that they expand to the same extent as said fulcrum, a clamp adjustably clamping said transformer vertically relative to said base, a second spacer between said beam and said armature, and a third spacer between said base and said clamp, the materials of said clamp, armature and spacers being such that the position of the midpoint of said armature relative to the null point of said transformer remains fixed despite temperture variations.

2. The improvement of claim 1 in which said gauge is longitudinally compensated comprising rod means extending parallel to said beam, a carriage supported by said rod means, first means drivingly interconnecting said carriage and said poise, and second means drivingly connecting said flexible member and said carriage, said base, and said beam having substantially the same coefficient of expansion, said flexible means being stretchable.

3. The improvement of claim 2 in which said drive means further comprises a first and a second sprocket rotatably mounted at opposite ends of said beam, said flexible member being a continuous loop passing around said sprockets, one said sprocket being driven from said servo-motor.

4. The improvement of claim 2 in which said beam has a horizontal longitudinal first shoulder and a downward-slanted longitudinal second shoulder and said poise has first roller means riding on said first shoulder and second roller means riding on said second shoulder, whereby thermal expansion in a transverse horizontal sense of said poise and said beam merely causes movement of said second roller means inward and outward of said second shoulder.

5. The improvement of claim 4 in which said first means comprises a roller having an axis at the same elevation as the axis of said first and second roller means, and the neutral axis of said beam, which is at the same elevation as the tilting axis of said fulcrum.

6. The improvement of claim 4 in which said rod means comprises a first and second rod vertically spaced and aligned, said carriage having top and bottom bores through which said first and second rods pass, said first rod being about at the elevation of the axes of said roller means, a bearing through said top bore through which said first rod slides, said second bore being vertically elongated, said first means being at the elevation of said first rod.

7. The improvement of claim 6 in which said rod means further comprises a third rod and which further comprises at least one limit switch connected into said electric circuit adjustably positioned on said third rod, and an actuator for said limit switch attached to said carriage to open said switch to stop said servomotor.

8. The improvement of claim 7 which further comprises a diode across the contacts of said limit switch arranged to pass reverse current only whereby if said limit switch is opened beause of overrun of said poise because of the effect extreme pressure variation on said pressure-responsive means, said poise can move in the opposite direction on cessation of said extreme pressure variation without restoration by external means.

9. The improvement of claim 7 in which said three rods are in vertical alignment and which further comprises a mounting bar at one end only of said rods secured to said rods and to said base.

10. The improvement of claim 2 in which said beam is a hollow tube cut away in a longitudinal slot at the bottom, said fulcrum extending up through said slot.

11. The improvement of claim 10 in which said beam and said base have a plurality of aligned, longitudinally spaced holes, said fulcrum and said pressure-responsive means being adjustably positioned along said beam and secured to said beam and said base by attachment means passing through selected aligned holes.

12. The improvement of claim 2 in which said electric circuit comprises a DC power source, an operational amplifier for said source, components imposing on the primary and secondaries of said differential transformer a sine wave current tuned to the inductance of said transformer, rectifier means for said secondaries, a phase sensitive demodulation means looped around each of the said secondaries, a power amplifier receiving the outputs of said secondaries and driving said servo-motor depending upon the position of said armature relative to said transformer.

13. The improvement of claim 12 which further comprises a tachometer type generator coupled to said motor and arranged to feed back to said power amplifier an anti-hunting current.

* * * * *